United States Patent [19]

Doran

[11] Patent Number: 5,220,152
[45] Date of Patent: Jun. 15, 1993

[54] RECHARGEABLE BATTERY POWERED ELECTRICALLY HEATED LOCK THAWING DEVICE WITH BUILT-IN BATTERY CHARGER

[76] Inventor: Edward A. Doran, 5317 Algonquin Trail, Kokomo, Ind. 46902

[21] Appl. No.: 436,731

[22] Filed: Nov. 15, 1989

[51] Int. Cl.$^5$ .................. E05B 17/00; H02J 7/00; H05B 3/00
[52] U.S. Cl. ........................ 219/201; 70/431; 219/202; 219/227; 219/238; 219/241; 320/2; 439/131
[58] Field of Search ............. 219/200, 201, 202, 221, 219/227–230, 236–241, 85.16; 70/431; 439/131; 320/2; 279/30

[56] References Cited

U.S. PATENT DOCUMENTS

| | | | |
|---|---|---|---|
| 1,497,363 | 6/1924 | Doppel | 279/30 X |
| 2,371,534 | 3/1945 | McGrath | 219/221 X |
| 2,894,506 | 1/1960 | Woerner | 219/85.16 |
| 2,965,741 | 12/1960 | Blazina | 219/201 X |
| 3,023,748 | 3/1962 | Bruskin | 219/201 X |
| 3,379,854 | 4/1968 | Jovis | 219/201 |
| 3,458,794 | 7/1969 | Bohnstedt et al. | 439/131 X |
| 3,955,064 | 5/1976 | Demetrio | 219/238 X |
| 4,647,832 | 3/1987 | Fenne et al. | 320/2 |
| 4,702,007 | 10/1987 | Nomura et al. | 320/2 X |
| 4,794,315 | 12/1988 | Pederson et al. | 320/2 |
| 4,857,702 | 8/1989 | Cafaro | 219/240 X |

FOREIGN PATENT DOCUMENTS

| | | | |
|---|---|---|---|
| 601355 | 7/1960 | Canada | 219/201 |
| 2810016 | 9/1979 | Fed. Rep. of Germany | 219/201 |
| 2825776 | 1/1980 | Fed. Rep. of Germany | 219/201 |
| 2914311 | 10/1980 | Fed. Rep. of Germany | 219/201 |
| 3136271 | 3/1983 | Fed. Rep. of Germany | 219/201 |

*Primary Examiner*—Anthony Bartis
*Attorney, Agent, or Firm*—Jerry T. Kearns

[57] ABSTRACT

An electrical lock thawing device includes a housing formed from a water-proof rubber material and enclosing a rechargeable battery and an electrical heating element. A switch on the housing is operative to selectively connect the battery to the heating element and a removable elongated blade extends through a slot in an end wall of the housing. The blade is heated by the heating element and is insertable into a key slot of a frozen lock. An electrical plug on a rotatable cylindrical member is mounted for movement between extended and retracted positions with respect to the housing and serves to connect the rechargeable battery to a conventional AC outlet. A resilient detent member selectively actuated by a spring-biased push button is operative to secure the rotatable plug in a selected position. The removable thawing blade may be formed in a variety of different key configurations for use in various different locks. A spring ball detent is utilized to removably retain the blade within the housing.

9 Claims, 4 Drawing Sheets

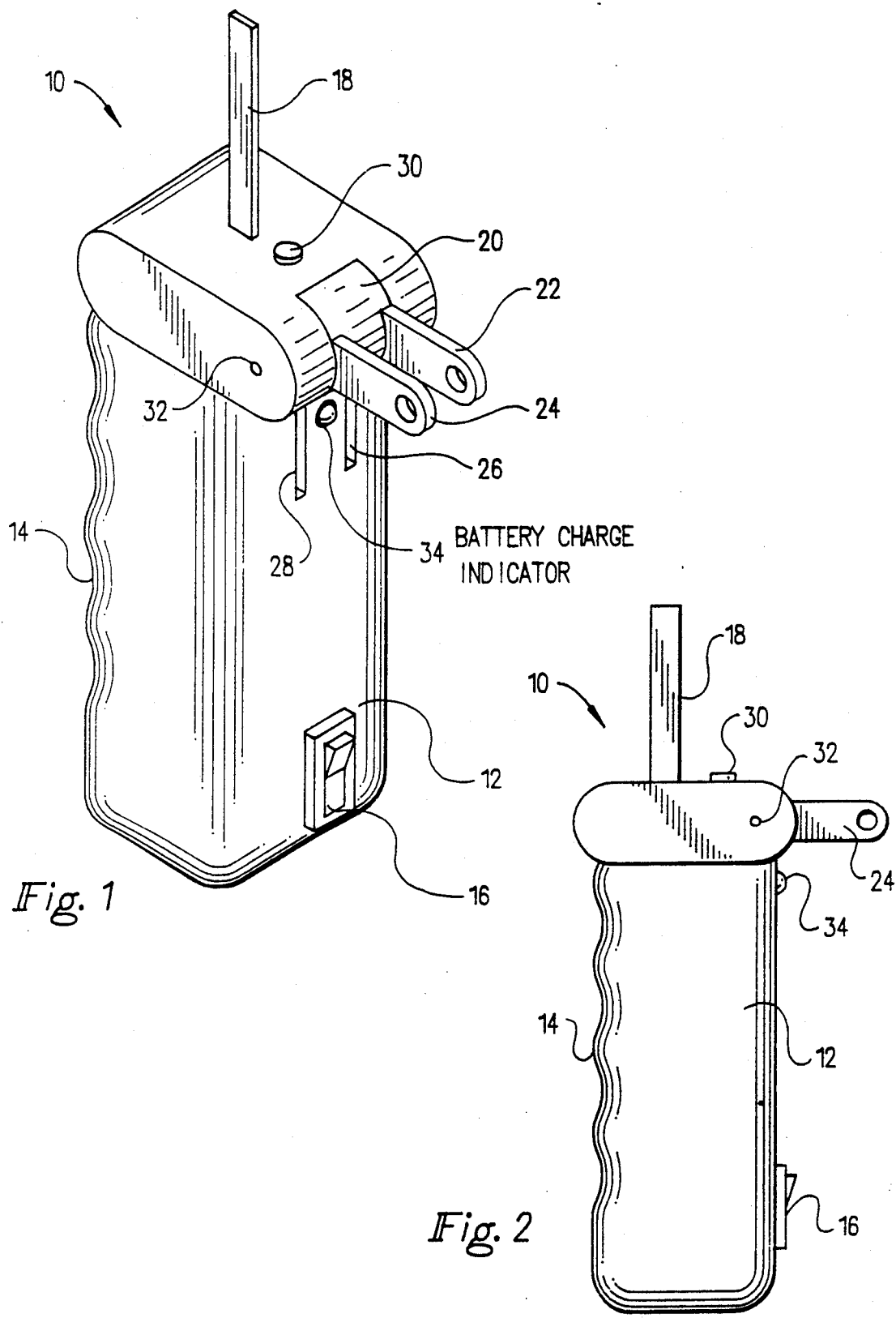

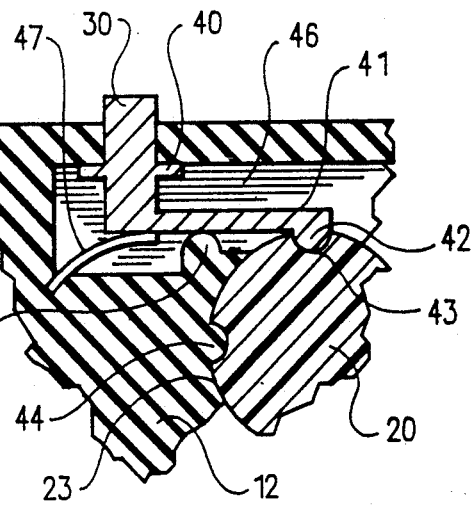
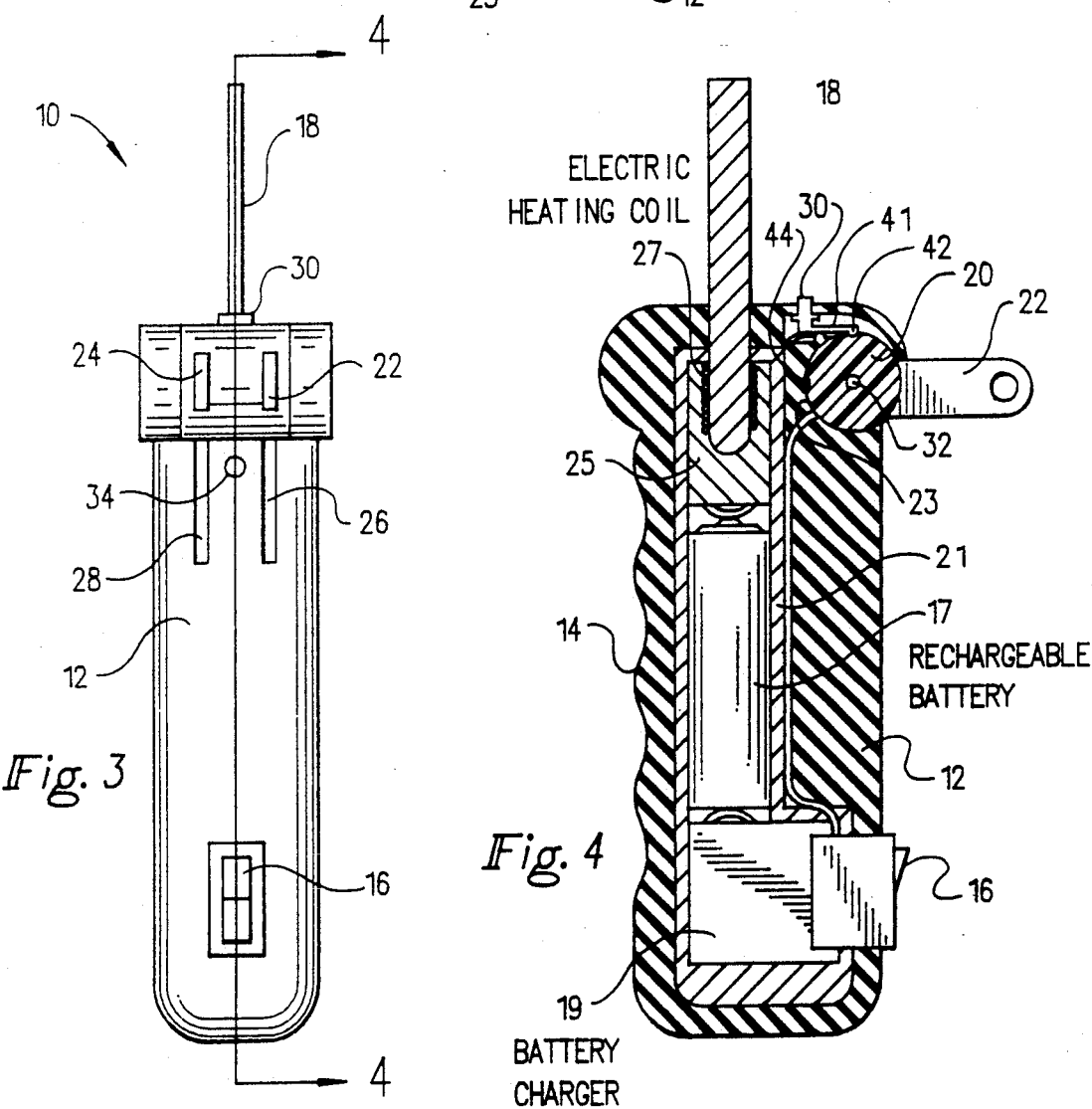

RECHARGEABLE BATTERY POWERED ELECTRICALLY HEATED LOCK THAWING DEVICE WITH BUILT-IN BATTERY CHARGER

BACKGROUND OF THE INVENTION

1. Field of the Invention

The present invention relates to electrical lock thawing devices, and more particularly pertains to an electrical lock thawing device of the type having an electrically heated elongated blade dimensioned for insertion into the key slot of a frozen lock cylinder.

2. Description of the Prior Art

Various types of electrical lock thawing devices are known in the prior art. A typical example of such an electrical lock thawing device is to be found in U.S. Pat. No. 3,022,408, which issued to R. Wagner on Feb. 20, 1962. This patent discloses an electrically heated key for unlocking a frozen lock which utilizes an electrical resistance heating element. U.S. Pat. No. 3,450,859, which issued to H. Brucker on Jun. 17, 1969, discloses a device for heating keys for defrosting frozen lock cylinders. The device includes a housing having an opening at one end and a carriage having clamping means for engagement with the head of a key. The housing includes a gas burner which is started and ignited by the movement of the carriage to extend the shank portion of a key. An alternative electrically heated embodiment is shown in FIGS. 8 and 9 and described in column 4, line 52 through column 51, line 12. U.S. Pat. No. 3,973,422, which issued to F. Cervera on Aug. 10, 1976, discloses a key case which includes a battery and a coil disposed in coaxial relationship with respect to a swivel pin for carrying keys. A switch selectively connects the battery and the coil for heating of the keys to assist in thawing frozen locks. U.S. Pat. No. 4,247,753, which issued to N. Jaronen on Jan. 27, 1981, discloses a battery operated portable thawing device for frozen locks which has an electrically heated thawing stick sized for insertion into a lock key hole. U.S. Pat. No. 4,303,825, which issued to N. Jaronen on Dec. 1, 1981, discloses a lock thawing device which utilizes an electrical resistance heating wire dimensioned for insertion into a lock key slot.

While the above mentioned devices are directed to electrical lock thawing devices, none of these devices utilizes a housing having a rechargeable battery and a plug mounted for movement between retracted and extended positions for engagement with a conventional AC in conjunction with the use of a removable heating blade retained by a spring ball detent. Inasmuch as the art is relatively crowded with respect to these various types of electrical lock thawing devices, it can be appreciated that there is a continuing need for and interest in improvements to such electrical lock thawing devices, and in this respect, the present invention addresses this need and interest.

SUMMARY OF THE INVENTION

In view of the foregoing disadvantages inherent in the known types of electrical lock thawing devices now present in the prior art, the present invention provides an improved electrical lock thawing device. As such, the general purpose of the present invention, which will be described subsequently in greater detail, is to provide a new and improved electrical lock thawing device which has all the advantages of the prior art electrical lock thawing devices and none of the disadvantages.

A representative embodiment of the concepts of the present invention is illustrated in the drawings and makes use of an electrical lock thawing device which includes a housing formed from a water-proof rubber material and enclosing a rechargeable battery and an electrical heating element. A switch on the housing is operative to selectively connect the battery to the heating element and a removable elongated blade extends through a slot in an end wall of the housing. The blade is heated by the heating element and is insertable into a key slot of a frozen lock. An electrical plug is rotatably mounted for movement between extended and retracted positions and serves to connect, the rechargeable battery to a conventional AC outlet. A push button actuated retaining mechanism is operative to secure the rotatable plug in a selected position. The removable thawing blade may be formed in a variety of different configurations for use in various different locks. A spring ball detent is utilized to removably retain the blade within the housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following decription or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electrical lock thawing device which has all the advantages of the prior art electrical lock thawing devices and none of the disadvantages.

It is another object of the present invention to provide a new and improved electrical lock thawing device which may be easily and efficiently manufactured and marketed.

It is a further object of the present invention to provide a new and improved electrical lock thawing device which is of a durable and reliable construction.

An even further object of the present invention is to provide a new and improved electrical lock thawing device which is susceptible of a low cost of manufacture with regard to both materials and labor, and which accordingly is then susceptible of low prices of sale to the consuming public, thereby making such electrical lock thawing devices economically available to the buying public.

Still yet another object of the present invention is to provide a new and improved electrical lock thawing device which provides in the apparatuses and methods of the prior art some of the advantages thereof, while simultaneously overcoming some of the disadvantages normally associated therewith.

Still another object of the present invention is to provide a new and improved electrical lock thawing device for expediently thawing frozen lock cylinders.

Yet another object of the present invention is to provide a new and improved electrical lock thawing device including a rechargeable battery conveniently connectable to a conventional AC outlet through selective use of a rotatable connecting plug.

Even still another object of the present invention is to provide a new and improved electrical lock thawing device having replaceable heated lock insertion blades.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the lock thawing device according to the present invention.

FIG. 2 is a side elevational view of the lock thawing device of FIG. 1.

FIG. 3 is a front view of the lock thawing device of FIG. 1.

FIG. 4 is a longitudinal cross sectional view, taken along line 4—4 of FIG. 3.

FIG. 4A is a partial cross sectional detail view illustrating the construction of the retractable plug retaining mechanism.

DESCRIPTION OF THE PREFERRED EMBODIMENT

Figure 5:
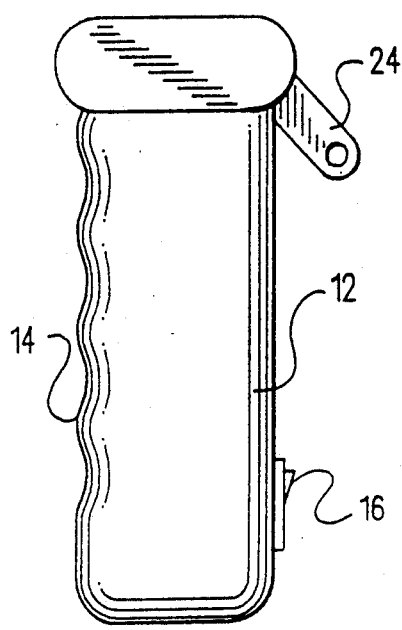
FIG. 5 is a side view illustrating the rotatable plug in a partially extended position.

With reference now to the drawings, and in particular to FIGS. 1 and 2 thereof, a new and improved electrical lock thawing device embodying the principles and concepts of the present invention and generally designated by the reference numeral 10 will be described.

More specifically, it will be noted that the first embodiment 10 of the invention includes an elongated generally rectangular housing 12 having a hand grip configured side wall 14 to facilitate manipulation in the palm of an individual's hand. The housing 12 is preferably formed from a rubber material having a water-proof construction. The housing 12 may be provided with suitable access panels and cooperating resilient sealing members for allowing access to the internal electrical components. A rocker switch 16 is provided on the housing 12 for selectively energizing an internal electrical resistance heating unit 25 and coil 27 operative to heat a metallic lock insertion blade 18. A rechargeable battery pack 17 and cooperating recharging unit 19 is disposed within the housing 12 and is provided with a battery power indicating light 34 operative to indicate a sufficiently charged battery. The construction of the electrical resistance heating element, rechargeable battery pack, and indicating light 34 is conventional. In order to recharge the internal battery, an extendable and retractable electrical plug includes a pair of prongs 22 and 24 which are configured for insertion into a conventional AC outlet. The prongs 22 and 24 are mounted in spaced parallel relation on a cylindrical member 20 which is rotatably mounted with respect to the housing 12 on an axle pin 32. The rotatable cylindrical member 20 is selectively lockable in the illustrated extended position, or in a fully retracted position, by an internal retaining mechanism. A release push button 30 is operative to disengage the internal retaining mechanism, to allow manual rotation of the cylindrical member 20. A pair of parallel slots 26 and 28 are formed in the housing 12 for reception of the prongs 22 and 24, when in a retracted position.

FIG. 3 is a front view illustrating the alignment of the slots 26 and 28 with the prongs 22 and 24 of the retractable electrical connector plug.

As shown in the cross sectional view of FIG. 4, a recharging unit 19, the rechargeable battery 17 and an electrical resistance heating unit 25 are retained within a water-proof interior compartment 21 formed within the housing 12. As previously described, suitable access covers and associated sealing gaskets may be provided to allow access to the interior electrical components. The rotatable cylindrical member 20 is rotatably mounted within the housing 12 and is supported within a partial cylindrical bearing recess 23. The push button retaining mechanism release 30 is operative to allow rotation of the member 20 about the axle in 32. The lock insertion blade 18 is surrounded by an insulated resistance heating coil 27 having one end connected to the upper positive terminal of battery 17 via metal unit 25, and an opposite end connected to the negative terminal of battery 17 through the switch 16, and is preferably surrounded by a resilient water-proof sealing ring or gasket (not shown). Additionally, it should be noted that the resistance heating unit 25 including the heating coil 27 may be formed integrally with the blade 18 to allow replacement as a single unit.

A pair of semi-spherical recesses 43 and 44 are formed at a 90 degree angular integral in the side wall of the cylindrical member 20. The push button 30 has an inner end secured to a transverse arm 41. The transverse arm 41 terminates in a semi-spherical projection 42 dimensioned for engagement with the recesses 43 and 44. A fulcrum 45 projects upwardly from the floor of an interior cavity 46 formed in the housing 12. The fulcrum 45 supports a midpoint of the transverse arm 41. A leaf spring 47 engages a bottom interior surface of the push button 30 and biases the push button 30 to the illustrated upward position. A radial flange 40 on the push button 30 retains the push button 30 within the cavity 46. Upon depressing the push button 30 against the bias of the spring 47, the transverse 41 will pivot upwardly about the fulcrum 45, thus releasing the projection 42 from the recess 43. This allows manual rotation of the cylindrical member 20 until the recess 44 comes into engagement with the projection 42. Thus, a retaining mechanism is provided for selectively locking the AC plug connector in either an extended or a retracted position. As an alternative to the leaf type spring 47, a coil spring may be utilized, without departing from the scope of the present invention. The push button 30 and transverse arm 41 are preferably formed from a resilient metal or plastic material.

Figure 6:
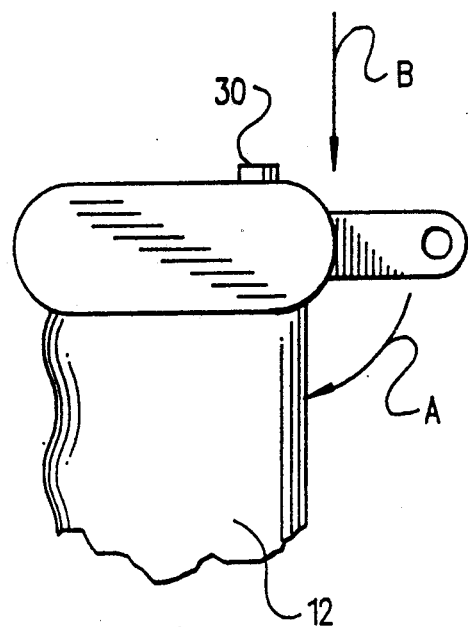
FIG. 6 is a partial side view illustrating the manner of retracting the rotatable plug.

FIG. 6 illustrates the manner of retracting the electrical plug. The prong 24 may be manually rotated in the direction of the arrow A after initially depressing the push button 30 as indicated by arrow B.

Figure 7:
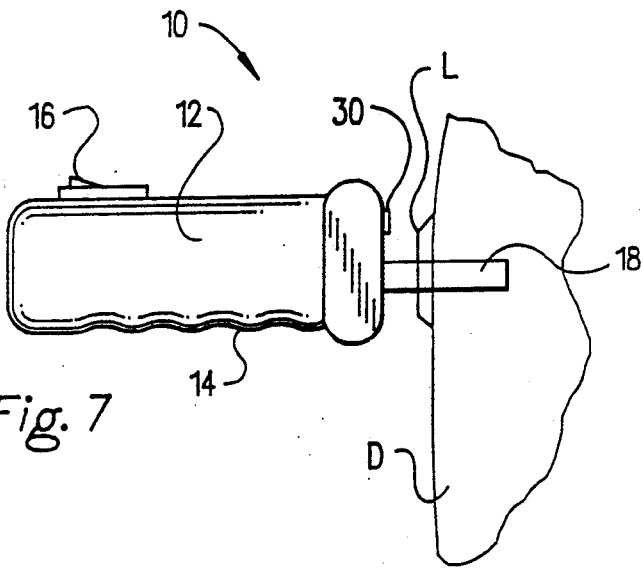
FIG. 7 diagrammatically illustrates the manner of use of the lock thawing device of the present invention.

FIG. 7 illustrates the manner of use of the thawing device 10 of the present invention. The blade 18 is inserted into a lock cylinder L, for example located, in the door D of an automobile. The rocker switch 16 is then activated, causing the blade 18 to be electrically heated.

Figure 8:
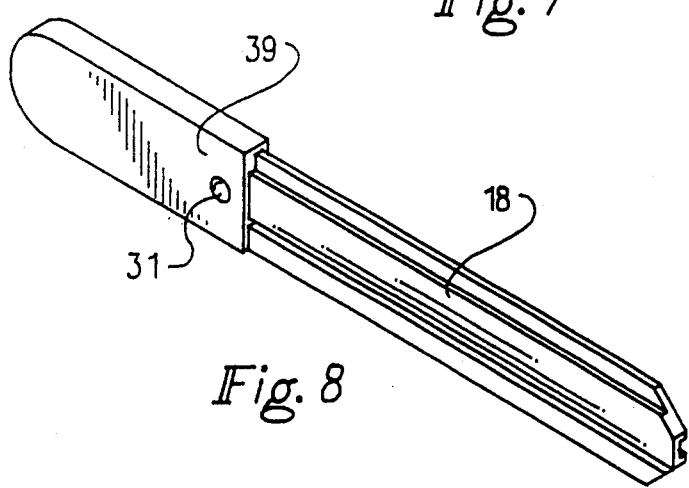
FIG. 8 is a perspective view illustrating a particular removable thawing blade of the lock thawing device of the present invention.

As shown in FIG. 8, the insertion blade 18 may be formed for use as a key. To this end, an end portion 39 is provided with a hemispherical recess 31 forming a portion of a spring ball detent mechanism for removably connecting the blade 18 to the heating unit 25.

Figure 9:
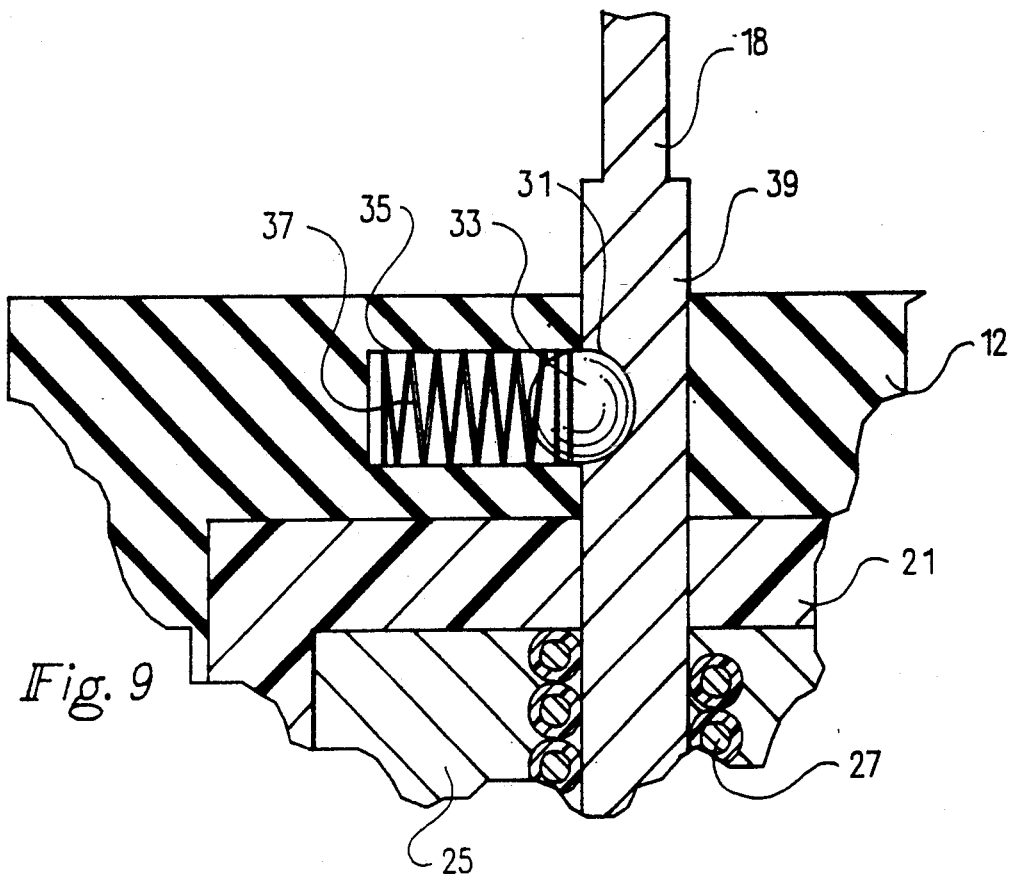
FIG. 9 is a partial cross sectional view illustrating the lock insertion blade detent retaining mechanism.
Figure 10:
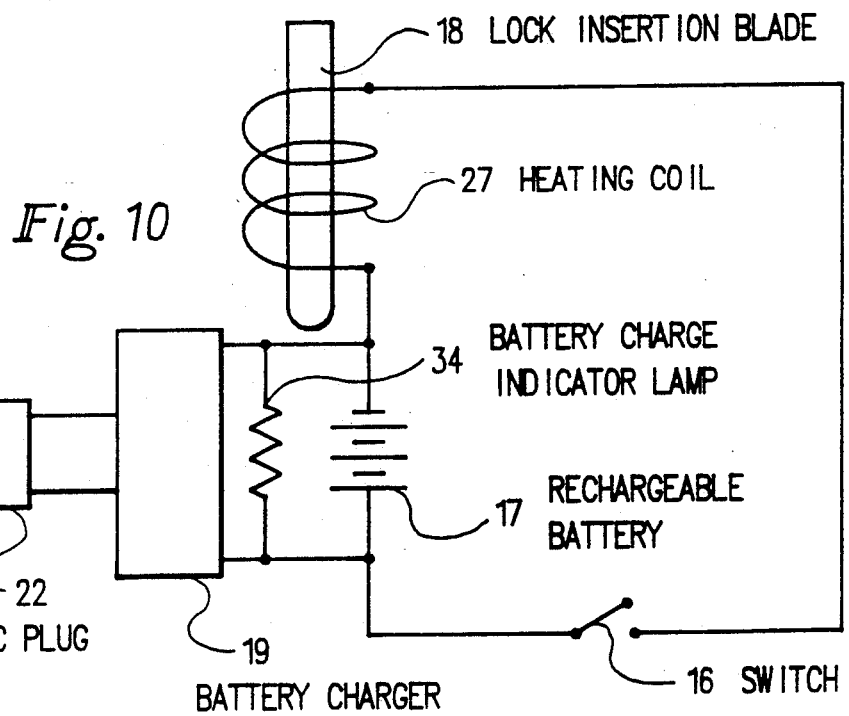
FIG. 10 is a schematic diagram of the electrical components of the lock thawing device of the present invention.

As shown in FIG. 9, a spherical ball 33 is mounted for transverse movement within a cylindrical well 35. The ball 33 is biased into engagement with the recess 31 by a coil spring 37. This spring ball detent securely retains the blade 18 within the housing 12, but yet allows expedient manual withdrawal of the blade 18 for replacement.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An electrical lock thawing device, comprising:
 a housing;
 a rechargeable battery in said housing;
 a recharging unit in said housing operably connected to said battery and an electrical plug on said housing configured for engagement with a conventional AC outlet and operably connected with said recharging unit for recharging said battery;
 said plug mounted for rotation between extended and retracted positions with respect to said housing;
 retaining means for retaining said plug in said extended and retracted positions including a resilient detent member on said housing engageable with said plug and actuated by a push button on said housing;
 an electrical resistance heating element in said housing;
 a switch for selectively connecting said battery to said heating element;
 an elongated blade having a first end in said housing disposed in heat exchange relationship with said heating element and a second end extending from said heating element exteriorly of said housing for insertion into a lock cylinder;
 said blade configured in the shape of a key for locking and unlocking a lock cylinder;
 a spring biased ball in said housing engageable in a recess formed on said blade removably securing said blade in said housing, whereby various differently configured blades for locking and unlocking various different lock cylinders may be connected to said lock thawing device.

2. The electrical lock thawing device of claim 1, further comprising a rotatable cylindrical member carrying said plug and mounted for limited reciprocal rotation in said housing between said extended and retracted positions of said plug.

3. The electrical lock thawing device of claim 2, further comprising a pair of angularly spaced depressions formed in said cylindrical member for selective engagement with said resilient detent member in said extended and retracted positions of said plug.

4. The electrical lock thawing device of claim 3, wherein said resilient detent member includes a transverse arm connected to said push button, said transverse arm terminating in a projection dimensioned for engagement in said depressions.

5. The electrical lock thawing device of claim 4, further comprising a spring urging said push button to an elevated position.

6. The electrical lock thawing device of claim 5, wherein said transverse arm is pivotally supported by a fulcrum member.

7. The electrical lock thawing device of claim 1, further comprising a pair of slots in said housing for receiving prongs of said plug in said retracted position of said plug.

8. The electrical lock thawing device of claim 1, wherein said housing is formed from a rubber material.

9. An electrical lock thawing device, comprising:
 a housing;
 a rechargeable battery in said housing;
 an electrical heating element in said housing;
 a switch for selectively connecting said battery to said heating element;
 an elongated blade having a first end in said housing disposed in heat exchange relationship with said heating element and a second end extending from said heating element exteriorly of said housing for insertion into a lock cylinder;
 said blade configured in the shape of a key for locking and unlocking a lock cylinder;
 a spring biased ball in said housing engageable in a recess formed on said blade removably securing said blade in said housing, whereby various differently configured blades for locking and unlocking various different lock cylinders may be connected to said lock thawing device;

a recharging unit in said housing and an electrical plug on said housing configured for engagement with a conventional AC outlet and operably connected with said recharging unit for recharging said battery;

said plug mounted for limited reciprocal rotation between extended and retracted positions with respect to said housing;

a pair of slots formed in said housing for receiving prongs of said plug in said retracted position of said plug;

a rotatable cylindrical member connected to said plug and mounted for limited reciprocal rotation in said housing between said extended and retracted positions of said plug;

a pair of angularly spaced depressions formed in said cylindrical member;

a push button extending externally of said housing and mounted for reciprocal axial movement between depressed and elevated positions;

a spring urging said push button to said elevated position;

a transverse arm connected to said push button, said transverse arm terminating in a projection dimensioned for selective engagement in said depressions; and a fulcrum member in said housing mounting said transverse arm for pivotal movement, whereby said projection on said transverse arm may be selectively engaged in one of said depressions to retain said plug in either said extended position or said retracted position.

* * * * *